Patented July 1, 1947

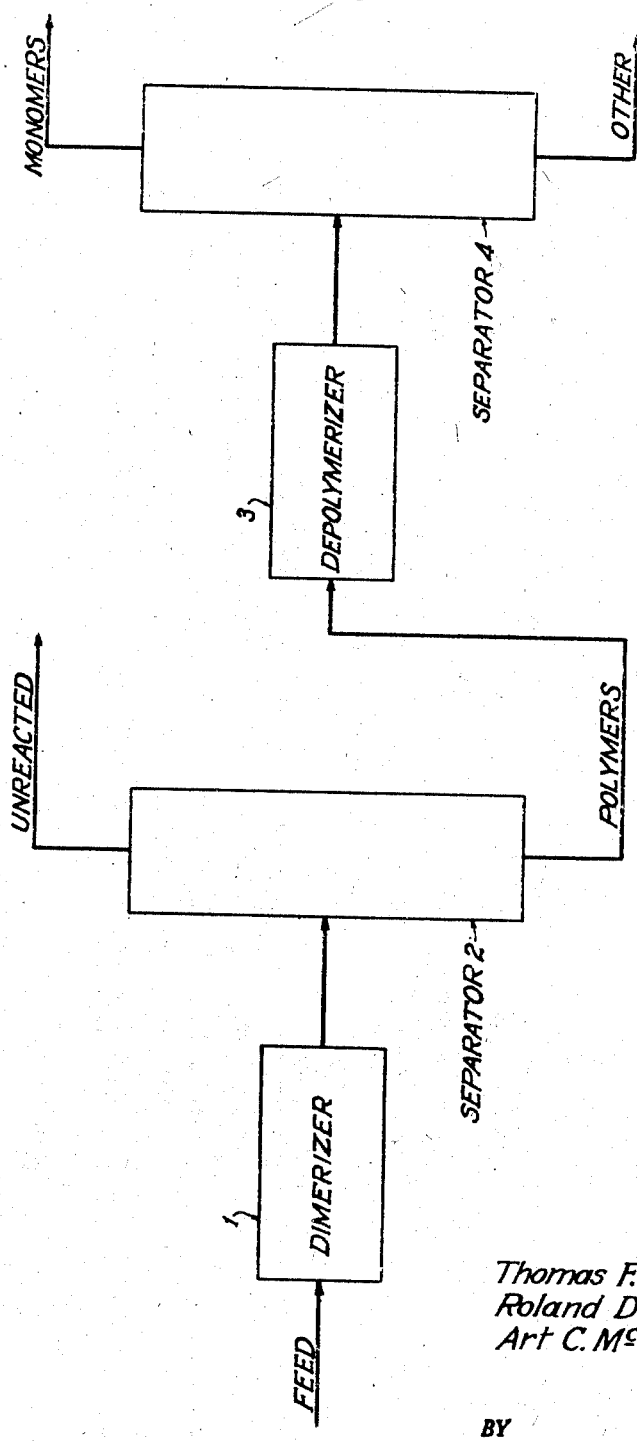

2,423,179

UNITED STATES PATENT OFFICE 2,423,179

RECOVERY OF DIENES BY POLYMERIZATION AND DEPOLYMERIZATION

Thomas F. Doumani, Roland Deery, and Art C. McKinnis, Long Beach, Calif., said Roland Deery now by judicial change of name to Roland Frank Deering, assignors to Union Oil Company of California, Los Angeles, Calif., a corporation of California Application September 7, 1942, Serial No. 457,634

11 Claims. (Cl. 260—681.5)

This invention relates to the production and concentration of dienes (diolefins), and has more particular reference to butadiene, with the object of using it for production of rubber-like material.

The principal object of the present invention is to be able to obtain concentrates of important dienes, that is, the conjugated dienes such as butadiene, in order to take advantage of their presence in petroleum refinery and similar gases where the concentration is ordinarily small, even after fractionation, to separate the four-carbon hydrocarbons. We have discovered that these dienes may be polymerized readily either to produce dimers, such as butadiene dimers, or to produce co-polymers with olefines such as butenes, and that excellent recovery of dienes can then be accomplished by separating and depolymerizing the dimers and other polymers.

Primarily, the invention comprises a process involving selective thermal polymerization of both conjugated dienes and mono-olefins, this being followed by selective depolymerization or cracking of the polymeric products. An important feature is the effect of oxygen upon the polymerization. The invention is applicable particularly to dienes containing fewer than seven carbon atoms, and to their recovery from hydrocarbon mixtures boiling below about 125° C., whereby they produce concentrates containing over about 40% dienes.

Dienes are of particular value because of their relatively great reactivity, particularly their tendency to polymerize or copolymerize with other organic compounds to form resins or rubbers. However, for many of these applications, it is necessary to have the diene in a pure state or at least in a highly concentrated mixture. For example, the butadiene used in the preparation of certain synthetic rubbers must be over 99% purity. Solvent extraction methods have heretofore been developed for preparing butadiene of this purity from concentrates containing 40% or more of butadiene, but these methods are relatively costly and inefficient when applied to stocks of less than about 40% concentration, and are practically inoperable for stocks of less than about 10% concentration. By far the largest and cheapest potential source of butadiene is the gas produced in the cracking of petroleum fractions for production of high octane gasoline. This gas, even when carefully fractionated to remove all hydrocarbons except those having four carbon atoms, normally has a butadiene content of only about 2% to 5%, although in some instances it may reach perhaps as high as 20% when fractionated, the remaining material being largely butylenes and butanes.

The invention includes polymerizing butadiene in the presence of butenes under conditions whereby some of the butadiene is polymerized with some of the butenes to yield butadiene-butene co-polymers. This is done in the presence of an accelerating agent which apparently catalytically influences the co-polymerization. The invention also includes the dimerization of butadiene under conditions to effect high percentage conversion of butadiene to butadiene dimer, without production of substantial proportions of resinous higher polymers. This reaction also is aided by said accelerating agent or catalytic material. The invention, according to one form, resides in using as such a catalytic material or accelerating agent an oxygenated form of the diene being polymerized or of the mono-olefins used, which may be considered an oxide thereof and possibly is a peroxide or ozonide, or a similar form of other hydrocarbons present, i. e. oxygen-bearing hydrocarbon derivatives. The invention further resides in employing in the polymerizing process oxygen or an oxygen yielding material (which otherwise is inert in the process) whereby the oxide or other catalytic agent is produced during the polymerizing operation, or the necessary form of oxygen is present in the equipment during use. The invention resides further in employing such a catalytic means in an amount in the order of a very small percentage of less than about one-tenth of 1% by weight of the total gases being treated, for example, about 0.01% or possibly as low as 0.001% where such a low percentage is effective.

The invention extends also to the treatment of other conjugated dienes than butadiene by the method herein indicated, such as for the concentration of isoprene, cyclopentadiene and the like.

The invention also extends to the depolymerization of the dimers and the co-polymers indicated, after they have been separated from the residual gases, whereby concentrates of the monomer are obtained for future use.

Briefly, one process of this invention consists in reacting the dienes and part of the mono-olefins to form a liquid polymer boiling above the maximum boiling point of the non-diene constituents of the feed stock mixture, separating said liquid polymer from the unreacted material, and subjecting the polymer product to depolymerization, followed by fractionation or extraction of the depolymerized product, if desired, to obtain the diene concentrate.

This process is illustrated in the flow diagram of the attached drawing, in which the feed is reacted in dimerizer 1 to form polymers, which are separated from unreacted materials in separator 2. The polymers are then depolymerized in depolymerizer 3 to form diene monomers which are separated from other products in separator 4. Individual features of this process which also involve invention reside in: (1) the control of the polymerizing conditions such as temperature, pressure, contact time, and the presence of oxygen or certain oxygenated compounds which yield oxygen or promote the polymerization, whereby the diene is caused to polymerize in a single or multi-stage process not only with itself, but with mono olefins which may be present, to form predominantly liquid polymers; (2) the character of the polymers, which are of cyclic structure, and may be used for further polymerization to resins, etc., or used as chemical intermediates; and (3) the control of the depolymerization process, whereby not only is the polymer depolymerized to regain the bulk of the diene involved in its preparation, but appreciable dehydrogenation is also accomplished, whereby further yields not only of diene, but of valuable aromatic type hydrocarbons are obtained. The depolymerization may also be a selective process whereby improved yields of desired products are obtained by fractionating the polymer, and subjecting the fractions separately to selected depolymerizing conditions.

Invention also resides in the combination of the above concentration process with the cracking process wherein the original diene-containing feed stock is produced. In this combination process, the unreacted product from the polymerization step is recycled to the cracking step. This cracking step may also be one part of a selective cracking system in which the depolymerization described above is the other part.

It has ben found that butadiene may be polymerized at temperatures between 300° C. and 600° C. and pressures preferably over 50 lbs. per square inch gage with contact times ranging from 0.01 minutes to 10 minutes or more. For example, at a temperature of 400° C. and a pressure of 500 lbs. gage, a contact time of 0.2 minutes (12 seconds) is sufficient to polymerize 34% of the butadiene present in a feed stock containing 40% butadiene and 60% normal butane. Similarly, at 500° C. and 500 lbs. gage, a contact time of 4 to 5 seconds is sufficient to polymerize about 50% of the butadiene present when a feed stock containing 15% butadiene is employed. As a rough approximation, it may be said that to maintain the same degree of polymerization, say 50% conversion of the butadiene, for example, an increase of 100° C. in the temperature requires a ten-fold decrease in the contact time. This may be expressed mathematically as $$\log t = -0.01\, T + K$$

where $t$=the contact time in minutes, $T$=absolute temperature in °Kelvin (°Kelvin=°centigrade+273), and $K$=a constant depending on the values of the other variables. Similarly, for a given conversion, say 50%, doubling the pressure halves the required contact time, i. e., $\log t = -\log P + K_2$ where $t$=contact time in minutes, $P$=absolute pressure in pounds per square inch (lbs. gage+14.7), and $K_2$ is a constant depending on other variables. Similarly, doubling the concentration of butadiene in the feed reduces the required contact time by a factor of about ⅔, or $\log t = -1.5 \log C + K_3$ where $t$=contact time in minutes, $C$=concentration of butadiene in feed in mol per cent, and $K_3$=a constant depending on other variables. Similarly, at least over the range 30% to 70% conversion, a 10% increase in conversion necessitates an increase of about 50% in the contact time, or $\log t = 0.017\, F + K_4$ where $t$=contact time in minutes, $F$=fraction converted in per cent, and $K_4$=a constant. The values of $K_1$, $K_2$, $K_3$ and $K_4$ may be calculated for any given conditions of temperature, pressure, etc., within the specified ranges by use of the data given for the above specified examples.

The above data were obtained from the results of runs in which liquid mixtures of butadiene and normal butane under the desired pressure as exerted on them by means of a hydrogen gas piston, were vaporized as they were passed into the upper end of a vertical mild steel reaction tube having a length of about two feet and an internal diameter of about ⅜ inch. This tube contained a concentric mild steel thermocouple well of about ¼ inch outside diameter, and was heated by means of an electric furnace just two feet in length. The reaction temperature was taken as the average temperature of a one-foot section of the hottest portion of the tube; the contact time was calculated for the entire two feet of reaction space, and was based on the composition and rate of production of liquid-free gas; and the percent conversion was calculated by olefin analysis of the liquid-free gaseous product, on the assumption that all the olefins present were unreacted butadiene. The percent conversion was also measured by weighing the liquid product obtained. This liquid product was found to be largely the butadiene dimer, with smaller amounts of higher liquid polymer, and very small amounts of solid resinous polymer. The proportion of dimer generally decreased as the percent conversion was increased by longer contact time.

The dimer was found to boil at about 130° C. and have a cyclic structure of the type indicated,

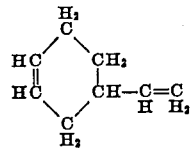

It was found to be useful for polymerization with other materials to form resins and rubber, and as a chemical from which many other valuable chemicals could be prepared by addition to the reactive double bonds, but both the dimer and the higher liquid polymers could be depolymerized to obtain substantial yields of the original diene. This provided a method for concentrating the diene from relatively dilute mixtures by polymerizing, separating the polymer from the unreacted residue, and depolymerizing the polymer.

It was found also that the pressure of mono-olefins in the feed mixture had little effect on the reaction under the above conditions. Also, corresponding reactions took place with other conjugated diolefins, such as isoprene and cyclopentadiene, and in fact any conjugated diene of less than seven carbon atoms.

It has now been discovered (1) that oxygen or, perhaps more accurately, reaction products of oxygen and the dienes or other hydrocarbons present, have a marked accelerating effect on the above polymerization reaction; (2) that in the presence of oxygen or oxygenated compounds, under the same conditions described previously, there is an appreciable co-polymerizing reaction between dienes and mono-olefins when the latter are present in the feed; (3) that such co-polymerization of dienes and mono-olefins may be caused to take place under the same temperature and pressure conditions described previously, even in the absence of oxygen or oxygenated compounds provided the contact times are increased sufficiently, as by a factor of about 2; (4) that under the latter conditions, particularly at temperature above 400° C. there is appreciable cracking of paraffins present in the feed stock to produce olefins, some of which also react with the diolefins; (5) that the products of such co-polymerization are also valuable chemicals; (6) that depolymerization of the co-polymer, under substantially the same conditions required for depolymerization of the dimer, gives yields of the monomer which are greater than those which might be expected from simple decomposition to the diene plus the mono-olefin, possibly as the result of concurrent dehydrogenation of the latter; (7) that in the process of depolymerizing the polymers, appreciable yields of aromatic-type hydrocarbons are obtained; and that (8) the depolymerization yield may be improved by fractionating the polymer and subjecting the fractions to different selected cracking conditions.

An improvement on the polymerization step of the process includes recycling the unreacted hydrocarbons from the polymerization to the cracking step by which the original feed stock for the polymerization was obtained.

The effect of oxygen or oxygenated compounds on the polymerization is illustrated by the following examples, in which the same equipment and operating technique used in the earlier work and described above was employed. In all the following examples, the butadiene contained in the feed stock had been exposed to air at intervals for a period of about a month, and was subsequently found to have a peroxide content estimated to be about 0.01%. In one example, a feed stock containing 40% of this butadiene, and 60% normal butane was subjected to a temperature of 400° C. and a pressure of 500 lbs. gage with a contact time of about 0.2 minute (12 seconds). This resulted in a conversion of 60%, based both on olefin analysis of the product gas and on measurement of the liquid product, whereas, as noted above, the use of unoxidized butadiene under the same conditions gave only a 34% yield. A feed stock containing 40% of the same butadiene, 40% butenes and 20% normal butane gave a 72% yield under the above conditions. At 415° C. and 500 lbs. pressure, using the feed stock containing 40% oxidized butadiene and 60% normal butane, an 84% yield was obtained in five seconds.

In addition to the oxygen-bearing compounds indicated as accelerating agents, it may be that oxygenated compounds formed in the apparatus itself by reason of the presence of oxygen are effective, possibly even such compounds formed with metal of the apparatus.

For the purpose of practical operation, the dimerization or co-polymerization of the diene, for example butadiene, either in the presence of butenes or not, will be carried on at pressures above atmospheric, and within the limits of about 50 lbs. to about 5,000 lbs. Commonly, a pressure of about 500 lbs. will be employed, although the pressure may be reduced as the concentration of the diene, such as butadiene, increases in the feed material. Ordinarily, the polymerization temperature will be between about 600° F. and 1100° F. (between about 300° C. and 600° C.), the optimum apparently being about 850° F. Here, feed materials, such as those obtained from petroleum refinery cracking operations and the like are fed into and through the system for the indicated short contact time, in the presence of the previously indicated type of catalyst, such as the peroxide of the diene being treated, or appropriate oxygen-yielding material which will produce such peroxide. The resultant polymerization product in the case of butadiene and butenes is liquid at normal temperatures and has a boiling point in the order of 250° F. to 275° F. (about 130° C.), and therefore is easily separated from residual gases. Where the accelerating, oxygen-bearing agent is not employed, prolonged contact times, as previously indicated, may be relied upon if necessary to accomplish similar co-polymerization, as between butadiene and butenes.

Depolymerization of the dimers or co-polymers may be effected as a subsequent part of the process, or it may be effected at any future time and at any other place where the butadiene or other diene is to be employed in its concentrated form. This depolymerization will be effected ordinarily at temperatures between about 1200° F. and 1600° F. (about 650° C. and 875° C.), and at partial pressures below atmospheric. A good operating pressure range lies between about 5 mm. and 500 mm. of mercury, e. g., about 100 mm. such as is accomplished by employing 8 mols of steam with one mol of butadiene polymer. Where a mixture of butadiene dimer and butadiene-butene co-polymer is depolymerized, the depolymerized product is principally butadiene and butene with a concentration in the order of 80% of butadiene.

In addition to operating upon concentrated four-carbon hydrocarbon gases, or the like, light gasoline, or other hydrocarbon cuts boiling below about 200° F., which contain the dienes, may be treated and resultant butadiene or similar polymer recovered by fractional distillation.

In polymerizing, it is desirable to avoid the formation of higher polymers and resins as much as possible. This may be done by (1) operation at relatively high temperatures, preferably above about 400° C., and relatively low pressures, preferably below about 1,000 lbs. pressure per square inch gage, operating at higher temperatures and lower pressures when the feed stock contains higher proportions of diene; (2) employing downward flow through a vertical reactor; and (3) employing reactors having a relatively low surface-to-volume ratio, for example, less than 500 square feet per cubic foot and preferably below about 100 square feet per cubic foot, particularly where the surface is mild steel.

The conditions favorable for depolymerization of the dimer are in general high temperatures in the region of 600° C. to 1.000° C., total low pressures or partial pressures, anywhere below atmospheric, attained by vacuum or by the presence of inert gases such as steam, flue gas, etc., and extremely short contact times in the region of about five seconds or less, such as down to about $1/100$ of a second or possibly less in some cases, using the shorter contact times at the higher temperatures, and in all cases having a very rapid heating to temperatures and extremely rapid quenching to below about 300° C. For example, by passing a mixture of butadiene dimer and water through a stainless steel tube at a temperature of 700° C., a partial pressure of about one-sixth atmosphere, and a contact time of about three seconds, with only a moderately rapid quench (cooling to below 300° C. in about 0.5 second), the total product gases other than water contained over 80% butadiene, the C4 fraction itself consisting of about 10% butanes, no butenes, and 90% butadiene. At shorter contact times with a more rapid quench, it is possible to obtain practically quantitative yields of butadiene from the dimer.

The dienes referred to in this invention are in general the conjugated dienes (the doubly bonded carbon atoms being separated by a singly bonded pair of carbon atoms, such as

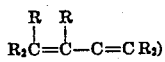

of either cyclic or acyclic structure, and of relatively low molecular weight, i. e., containing less than about seven carbon atoms. Dienes which are not conjugated are frequently isomerized to the conjugated form under the conditions indicated above for the dimerizing reaction. It is possible to apply the invention therefore also to those nonconjugated dienes which readily isomerize to conjugated dienes, and where "conjugated dienes" are specified in this application these are meant to include those dienes which readily isomerize to the conjugated type under the condition of the reaction in question.

The dienes of this invention boil within the range of about —20° C. to +120° C. (0° F. to 250° F.). The preferred group, according to this invention, is the group of the simpler, lower boiling ones, consisting of butadiene, isoprene and cyclopentadiene, which boil at about —5° C., 34° C., and 43° C., respectively.

Besides dimerizing the dienes themselves, it is also possible to co-dimerize two or more different conjugated dienes, and to depolymerize the co-dimers again to the simple dienes, using the same general conditions outlined above. Wherever more than one diene is involved in the processes of this application, the word "dimers" shall be construed to include codimers also unless otherwise specified.

It is desirable that the feed stock to be dimerized contain no large amounts of hydrogen or hydrogen sulfide because of possible side reactions, but inert materials such as nitrogen, etc., are not harmful. Thus a wide variety of liquid or gaseous mixtures containing the conjugated dienes of this invention may be "dimerized" and the products may be fractionated to obtain a fraction free from conjugated dienes, and a fraction containing the dimers in concentrated form. From the latter fraction, the concentrated original dienes may be obtained by depolymerization, finally segregating nearly pure individual dienes from the depolymerization product by fractionation. There are many obvious modifications of this and the other processes mentioned in this application which are to be considered parts of the invention as covered by the following claims.

We claim:

1. A process for concentrating conjugated dienes containing fewer than seven carbon atoms from hydrocarbon mixtures containing them, which comprises subjecting such mixtures to elevated temperatures between about 600° F. and 1100° F. and superatmospheric pressures in the presence of an oxygen-bearing hydrocarbon derivative capable of accelerating dimerization of the diene to dimers, and recovering the dimerized product from the residual materials.

2. A process for concentrating conjugated dienes containing fewer than seven carbons which comprises subjecting a mixture containing in the order of 2% to 5% such dienes and also containing olefins to elevated temperatures between about 600° F. and 1100° F. and superatmospheric pressures in the presence of an oxygen-bearing hydrocarbon derivative capable of accelerating dimerization of the dienes and co-polymerization of dienes and olefins, and separating the dimers and copolymers from the residual material.

3. A process according to claim 1 wherein the oxygen-bearing material is a diene oxide.

4. A process according to claim 1 wherein the oxygen-bearing material is an oxygenated compound of hydrocarbons undergoing treatment.

5. A process according to claim 2 wherein the oxygen-bearing material is an oxide of the class consisting of diene and olefin oxides.

6. A process according to claim 2 wherein the oxygen-bearing material is an oxygenated compound of hydrocarbons undergoing treatment.

7. A process according to claim 1 wherein the diene is butadiene.

8. A process according to claim 2 wherein the diene is butadiene and the olefins are butenes.

9. A process for concentrating conjugated dienes containing fewer than seven carbon atoms from mixtures containing them in small proportions in the order of 2% to 5%, which comprises subjecting such a mixture to elevated temperatures between about 600° F. and about 1100° F. and at pressures between about 50 pounds and about 5,000 pounds, in the presence of oxygen-bearing hydrocarbon derivative having dimerization accelerating properties whereby to form diene dimers, separating the dimerized products from the resdiual materials, and depolymerizing the dimerized product to yield the diene monomer in concentrated form by subjecting the dimer to temperatures between about 1200° F. and 1600° F. under partial pressures below atmospheric.

10. A process according to claim 9 wherein the diene is butadiene.

11. A process according to claim 2 and the additional step of depolymerizing the separated dimers to obtain concentrated dienes.

THOMAS F. DOUMANI.
ROLAND DEERY.
ART C. McKINNIS.

REFERENCES CITED

The following references are of record in the file of this patent:

UNITED STATES PATENTS

| Number | Name | Date |
|---|---|---|
| 1,065,182 | Staudinger | June 17, 1913 |
| 1,168,070 | Holt | Jan. 11, 1916 |
| 1,640,975 | Brown | Aug. 30, 1927 |
| 1,823,495 | Krauch et al. | Sept. 13, 1931 |
| 2,355,392 | Oberfell | Aug. 8, 1944 |

FOREIGN PATENTS

| Number | Country | Date |
|---|---|---|
| 265,172 | Germany | Apr. 28, 1912 |
| 343,116 | Great Britain | Feb. 16, 1931 |

OTHER REFERENCES

Egloff, "Reactions of Pure Hydrocarbons," pub. Reinhold Pub. Corp., New York (1937), page 376 (1 page only). (Copy in Division 31.)